United States Patent
Arnon et al.

(10) Patent No.: US 12,041,077 B2
(45) Date of Patent: Jul. 16, 2024

(54) AI/ML APPROACH FOR DDOS PREVENTION ON 5G CBRS NETWORKS

(71) Applicant: EMC IP Holding Company LLC, Hopkinton, MA (US)

(72) Inventors: Ohad Arnon, Beit Nir (IL); Dany Shapiro, Alfi Menashe (IL); Shiri Gaber, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 111 days.

(21) Appl. No.: 17/160,164

(22) Filed: Jan. 27, 2021

(65) Prior Publication Data
US 2022/0239690 A1      Jul. 28, 2022

(51) Int. Cl.
| G06F 21/00 | (2013.01) |
| H04L 9/40 | (2022.01) |
| H04L 41/16 | (2022.01) |
| H04L 69/22 | (2022.01) |

(52) U.S. Cl.
CPC ......... *H04L 63/1458* (2013.01); *H04L 41/16* (2013.01); *H04L 63/1425* (2013.01); *H04L 69/22* (2013.01)

(58) Field of Classification Search
CPC ................. H04L 63/1458; H04L 41/16; H04L 63/1425; H04L 69/22
See application file for complete search history.

(56) References Cited

U.S. PATENT DOCUMENTS

| 9,584,482 | B2 * | 2/2017 | Burns ................. H04L 12/6418 |
| 2015/0326589 | A1 * | 11/2015 | Smith ..................... H04L 63/02 726/1 |
| 2016/0191549 | A1 * | 6/2016 | Nguyen ................. H04L 43/12 726/23 |
| 2018/0077178 | A1 * | 3/2018 | Beauchesne ........... G06N 5/022 |
| 2019/0042744 | A1 * | 2/2019 | Rajasekharan ....... G06F 21/565 |
| 2019/0140904 | A1 * | 5/2019 | Huang ................ H04L 41/0893 |
| 2019/0149560 | A1 * | 5/2019 | Mhatre ............... H04L 63/1425 726/23 |
| 2019/0294995 | A1 * | 9/2019 | Pastor Perales ......... G06N 5/04 |

(Continued)

FOREIGN PATENT DOCUMENTS

| CN | 110958257 A | * | 4/2020 | ......... H04L 63/1416 |
| WO | WO-2018220426 A1 | * | 12/2018 | |
| WO | WO-2020256706 A1 | * | 12/2020 | ............ H04W 16/14 |

OTHER PUBLICATIONS

"Cyber attacks again hit Israel's water system, shutting agricultural pumps," The Times of Israel, Retrieved at https://www.timesofisrael.com/cyber-attacks-again-hit-israels-water-system-shutting-agricultural-pumps/, Retrieved on Jul. 2020, pp. 1-3.

(Continued)

*Primary Examiner* — Michael M Lee
(74) *Attorney, Agent, or Firm* — Workman Nydegger (57) ABSTRACT

One example method includes collecting, in a closed network, raw network traffic from one or more devices in the closed network, extracting metadata from the raw network traffic, processing the metadata, analyzing the metadata after the metadata has been processed, and based on the analyzing, determining whether or not an actual attack or attack threat is present in the closed network. If an attack or threat of attack is determined to exist, one or more remedial actions may then be taken.

18 Claims, 4 Drawing Sheets

(56) References Cited

U.S. PATENT DOCUMENTS

| | | | | |
|---|---|---|---|---|
| 2020/0287790 A1* | 9/2020 | Srinivas | .................. | H04L 43/12 |
| 2020/0329072 A1* | 10/2020 | Dubois | .................. | G08B 21/18 |
| 2021/0112091 A1* | 4/2021 | Compton | ............ | H04L 63/1416 |
| 2021/0194894 A1* | 6/2021 | Anderson | ........... | H04L 63/1425 |

OTHER PUBLICATIONS

Intel, "Dell EMC Enterprise Private Mobility as a Service," Dell Inc., 2019, pp. 2.
Wikipedia, "DICOM," Retrieved at https://en.wikipedia.org/wiki/DICOM, Retrieved on Mar. 2022, pp. 1-10.
Wikipedia, "Stuxnet," Retrieved at https://en.wikipedia.org/wiki/Stuxnet, Retrieved on Mar. 2022, pp. 1-29.

* cited by examiner

AI/ML APPROACH FOR DDOS PREVENTION ON 5G CBRS NETWORKS

FIELD OF THE INVENTION

Embodiments of the present invention generally relate to DDOS attacks. More particularly, at least some embodiments of the invention relate to systems, hardware, software, computer-readable media, and methods for DDOS (Distributed Denial of Service) attack prevention in communication networks.

BACKGROUND

Applications whose development is reliant upon 5G technologies, such as the CBRS implementation, require by definition a low latency network and, as such, any damage to the network and its response time, can directly lead to critical damage to its dependent systems, that is, dependent systems of the network.

Accordingly, one of the main challenges for wide deployment of applications over 5G cellular communication networks relates to security concerns. For example, a common attack that causes a failure in the network is a DOS (denial-of-service) attack or DDOS (distributed denial-of-service) attack in which multiple, possibly legitimate, systems flood the bandwidth or resources of a targeted system.

At least some cellular communication networks are divided into several parts that require protection. For example, one part of a cellular network that is exposed to threats is the radio technology, that is, the Radio Access Network (RAN). Thus, there is a need to protect the RAN against harmful attacks. Currently, this is achieved by common techniques originating from the "Anti-Electronic warfare" field, for example, by limiting limit specific frequencies, bandwidths, modulation and polarization, in an attempt to reduce attacks.

Another part of a cellular communications network that may be exposed to attacks is the fronthaul network layer, where another SDS (software defined security) layer of protection may be deployed in the majority of networks. One SDS layer for LTE networks is SIM (subscriber identity module) authentication, where the SIM card is used for user identification, authentication and message encryption.

However, SDS based approaches, and anti-electronic warfare techniques, may not be effective in preventing, or dealing with, attacks involving "legit calls," that is, calls from legitimate users. In case of a flood of legit calls to the system, conventional strategies involve the use of WWW DDOS protection techniques. These are typically rule-based approaches. For example, one such technique may employ a rule that specifies that calls coming from defined countries, or IP addresses, should be ignored. As another example, a rule may operate to limit the number of calls handled by the server in a particular time window.

5G cellular communication networks that support mission critical applications may be closed networks must be protected against "internal" attacks. Thus, a paradigm change may be required to address such circumstances. Such a change is needed to avoid a lack of communication, or introduction of latency to critical systems, even when the attack comes from within the system. As an illustrative example of a closed critical system that has been interrupted, the Siemens SCADA system was believed to have been infected as early as 2005 with a computer warm that was built into the systems. This was uncovered in 2010 after damage had already occurred to the gas centrifuges used for separating nuclear material. The worm compromised the entire uranium enrichment process for several years afterward.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to DDOS attacks. More particularly, at least some embodiments of the invention relate to systems, hardware, software, computer-readable media, and methods for DDOS (Distributed Denial of Service) attack prevention in communication networks.

In general, example embodiments of the invention may be employed in closed CBRS (Citizen's Broadband Radio Service) network systems. Example embodiments embrace a solution that may simultaneously detect and ignore the internal attack originating from trusted devices within the network, while maintaining the operation of critical services. Example embodiments may involve the addition of a component to the data plane, and running a learning model that captures the normal behavior of all traffic per connected system/device within the network. Embodiments of the disclosed functionality may be implemented on an edge-node as a VNF (virtual network function) that is exposed to the entire data plane. Once an exception is identified by the VNF, the exception may be automatically ignored.

Some embodiments may be implemented as an extension of a service that is provided by Dell Technologies, referred to as 'Private Mobility as a Service' (PMaaS) that allows replacement of wired networks, and augmentation of mobile networks, with wireless CBRS technology. The combination of the PMaaS functionality and the functionality of example embodiments, which may be implemented in a security layer of the PMaaS platform, may allow service providers to deploy private mobility networks to address the business and mission-critical needs of their customers. Appendix A to this disclosure, incorporated herein in its entirety by this reference, includes further details on the PMaaS platform.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may enable the prevention of attacks that are initiated within a closed network. An embodiment may be able to quickly identify, and deal with, attacks based on an awareness of what constitutes normal behavior of entities that are part of a closed network.

A. Overview 5G is the 5th generation technology for cellular networks. One of the main motivations for the transformation to 5G from 4G LTE is to further reduce the network latency relative to 4G networks. This is important for supporting mission critical systems such as autonomous vehicles, military and hospitals wireless functionality, and more. One of the new implementations of 5G is CBRS which is a Frequency broadband designed based on 5G LTE, currently deployed by enterprises and critical mission organizations to augment their wireless communication capabilities.

A significant challenge for wide deployment of applications over 5G networks are security concerns. Two of the most common attacks that causes a failure in the network is a DOS (denial-of-service) attacks, and DDOS (distributed denial-of-service) attacks, when multiple, possibly legitimate, systems and/or devices flood the bandwidth or resources of a targeted system, thus compromising or preventing system operations.

In more detail, the security of 5G systems is typically fixed. Telecommunication network security is often defined by the following components which apply to the 5G system regardless of attack attributes: standardization; network design; network configuration; network deployment; and, operation. Yet typical best practices are not adequate to deal with all attacks, for instance DDoS attacks, and radio jamming. In fact, a trivial cyberattack may able to infect a device within a targeted network and destabilize mission-critical network functionality throughout the network.

Many of such networks may employ IoT devices that are highly vulnerable to DDoS attacks. While IoT devices are an integral part of this emerging technology, they may present never before seen security risks. IoT devices themselves are designed for a specific use and security is usually an afterthought, yet it is critical that even these basic devices are protected, especially in case of mission-critical legacy systems such as those employed in hospitals, military applications, and manufacturers.

A related issue is that CBRS networks based on 5G technology may introduce new attack surfaces. For example, a significant architectural change is the fact that CBRS uses the 5G EPC (evolved packet core) stack. This has not been tested with regards to security. Moreover, LTE and 4G security approaches are not guaranteed to work for the new 5G network architecture, with the result that the new 5G network architecture will likely require a change in security paradigm.

As well, closed networks are still prone to attacks from within the network. There is a perception that closed networks are secure, unlike open networks, due to the fact that CBRS networks have SIM based authentication in place. This has been proven to be false (see, e.g., en.wikipedia.org/wiki/Stuxnet). Closed networks are vulnerable to other types of threats that may present an enhanced risk, since the attack is coming from within the system. Furthermore, many of the supported services are mission-critical which is why they are disconnected from the internet in the first place.

B. Aspects of Some Example Embodiments

With the foregoing in view, further details are now provided concerning some example embodiments of the invention. As noted earlier, DDOS prevention approaches created for WWW (i.e., internet sites) are based on the use of static rules. Those approaches are not designed to prevent an internal attack originating from an authorized user in a closed network. The expected large scale transfer to CBRS networks, using 5G technology, will require a change in the current security paradigm.

At least some embodiments of the invention embrace a virtualized component, or network function virtualization (NFV), that implements an AI/ML (artificial intelligence/machine learning) model for DDOS prevention in CBRS networks. This component may reside in the data plane layer and may be exposed to all the network traffic. The AI/ML model may learn the normal behavior of the data plane network traffic during a training period. Upon deployment of the virtualized components, the virtualized component may operate to identify, and then mitigate, any exceptions.

Figure 1:
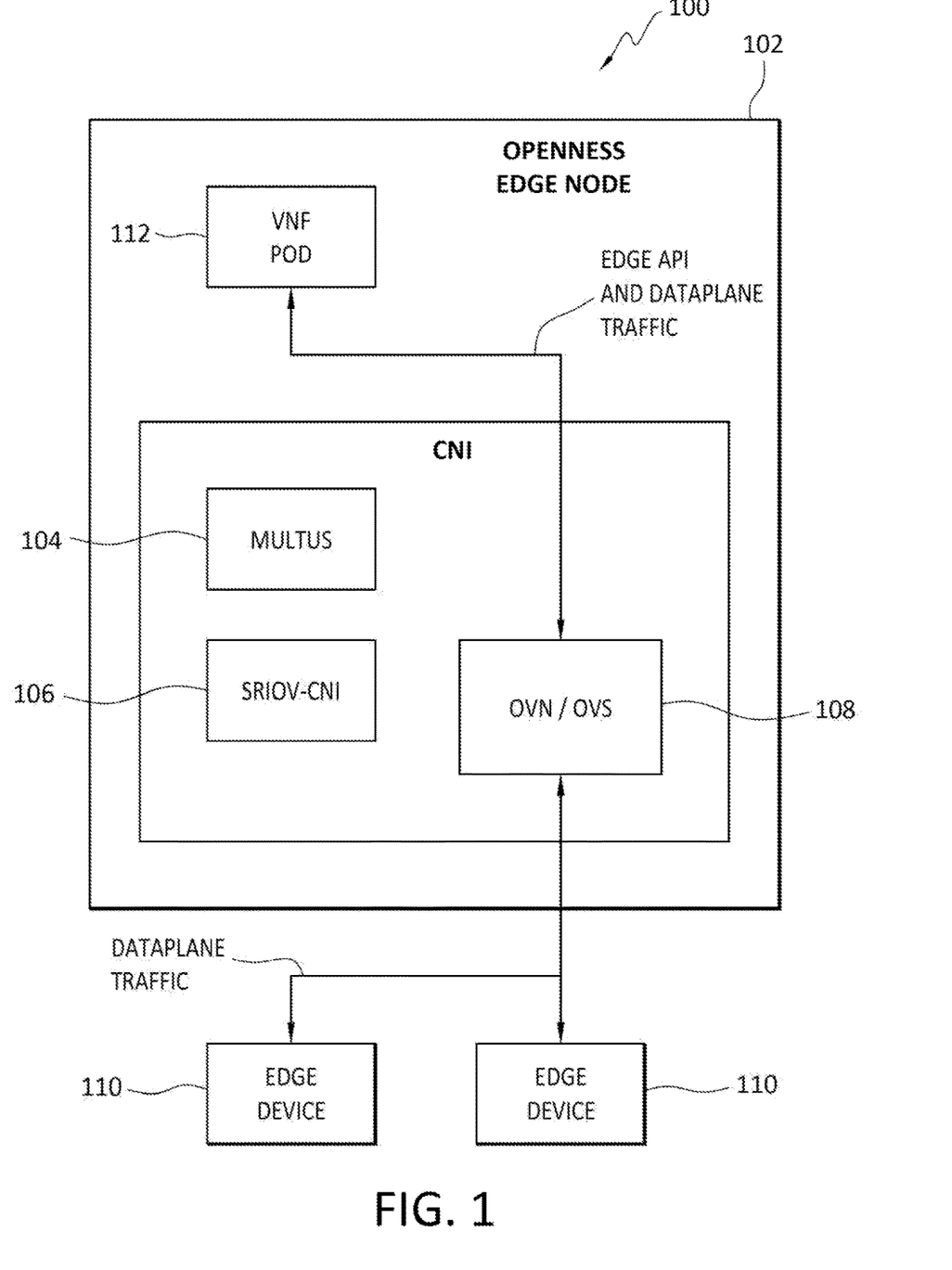
FIG. 1 discloses aspects of an example architecture.

As indicated in the example of FIG. 1, at least some embodiments may be based on OpenNESS (open network edge services software), an edge-device management framework, based on Kubernetes. The architecture of OpenNESS is structured in such a way that it separates a control plane from a data plane, that is, it provides for control/user plane separation (CUPS). This may be done, for example, by way of an OpenNESS edge node 102 that is part of a closed network, such as a 5G CBRS network for example, and includes a Multus CNI (container network interface) plugin 104, in combination with the SRI-IOV (single-root input/output virtualization) CNI plugin 106 with an OVN/OVS (Open Virtual Networking/Open vSwitch) 108.

More particularly, data plane traffic to/from one or more edge devices 110, such as IoT devices for example, may be directed to the OVN/OVS 108, which may pass the data plane traffic to a VNF pod 112 that is configured and arranged to be exposed to all of the data plane traffic. In brief, and as discussed in further detail below, the VNF pod 112, which may implement AI/ML functionality, may evaluate the data plane traffic and take action, such as threat mitigation for example, based on the outcome of the evaluation. In this way, real-time analytics may be deployed on data plane traffic.

In general, an ML model such as may be implemented in the VNF pod 112 may employ features that may be calculated from raw traffic data of the data plane traffic. These features may comprise two groups. The first group of features may comprise frame header fields such as, but not limited to, source port, destination port, header length, checksum, acknowledgment number, time frame, and window size. The second group of features may comprise engineered features such as, but not limited to, messages rate, open session time, maximum messages rate in a time window, distance from similar messages average attributes, repeating messages from same source, and a sequence of identical URGbit/ACKbit/PSHbit/RTS/SYN/FIN codes.

A more detailed illustration of the example architecture 100 disclosed in FIG. 1 is set forth in Appendix B to this disclosure. Appendix B is incorporated herein in its entirety by this reference.

Figure 2:
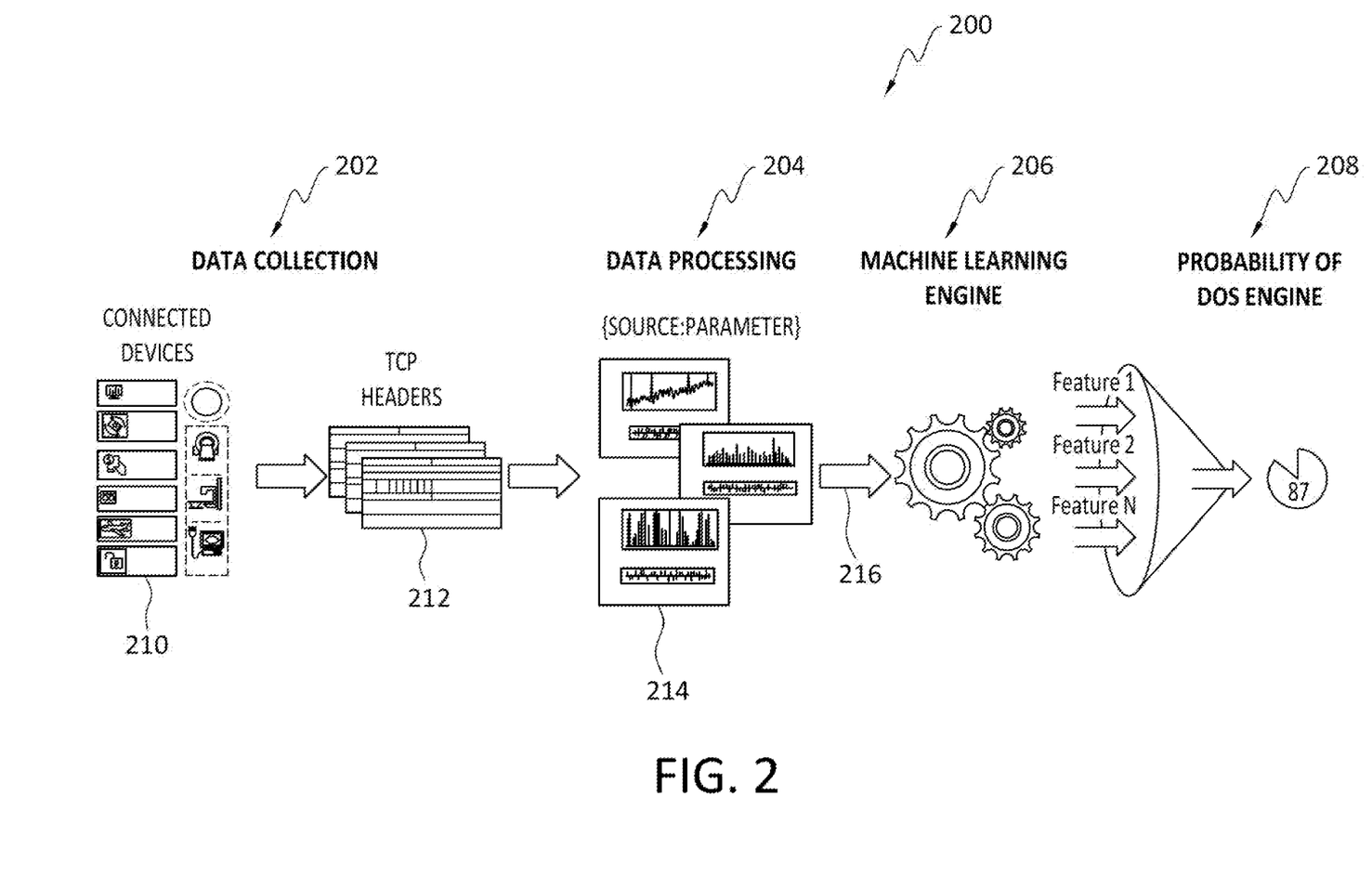
FIG. 2 discloses aspects of an example monitoring pipeline.

With reference next to FIG. 2, an example ITOA (IT operational analytics) pipeline 200 is disclosed that may be employed in embodiments of the invention. The ITOA pipeline 200 may also be referred to simply as a 'monitoring' pipeline, insofar as the ITOA pipeline 200 may implement the monitoring and evaluation of data plane traffic. In general, the ITOA pipeline 200 may be considered as implementing various functions, each of which may be carried out by a respective module or modules.

Particularly, the ITOA pipeline 200 may implement a data collection function 202, a data processing function 204, and a machine learning function 206 implemented by an AI/ML engine, which may cooperate with each other to enable generation of an ITOA pipeline 200 output 208, such as information indicating the probability of an attack, such as a DOS attack for example, on a network whose data plane traffic has been evaluated by the ITOA pipeline 200. In some example embodiments, the data collection 202, data processing 204, machine learning functions 206, and output 208 generation, may be performed by a VNF pod.

As shown in FIG. 2, data may be generated by various devices 210 connected to a network, such as a 5G network for example, by a CBRS network. The devices 210 may comprise IoT devices, but that is not required. Metadata concerning the data generated by various devices 210 and/or extracted from that data, such as TCP (transmission control protocol) headers for example, may be collected from the data plane and placed in a centralized queue. In some embodiments, the data and/or metadata that is collected during data collection 202 may be collected by a sniffer or other device that has access to all the network traffic, such as by way of the data plane for example.

The data and/or metadata, collectively denoted at 214, may then be aggregated, as part of the data processing 204 for example, for later forensic analysis. The data processing 204 may also comprise processing the data into continuous time series data extracted from the raw traffic data, and whose temporal patterns can be learned, such as by an ML engine for example, such that the differences between the predicted and the actual value for each feature of the data gathered from the data plane is calculated. These differences may collectively define a residuals vector. Note that the time series data may also be referred to herein as time series features. Data and/or metadata accessed and/or processed as part of the data processing 204 may include the source of the data, and any parameters specific to that source and its data.

All the individual features may be integrated as input 216 to one AI/ML system baseline behavioral model, such as an AI/ML engine that may implement AI and/or ML functionality 206. A GMM (Gaussian mixture model) module, which may be implemented by the AI/ML engine, may be used to identify anomalies in different operational modalities of the system, that is, the network whose data traffic is being evaluated. The GMM module may provide for generating probability distributions for the system behavior as a whole, as well as for generating a probability that a particular attack and/or type of attack will occur. In some embodiments, the AI/ML functionality 206 may involve time series modeling for one or more KPIs (key performance indicators) that characterize the network traffic. For example, counts of specific KPI values may be collected, and predicted KPI values generated based on the actual KPI values and/or based on the counts of the actual KPI values. Comparisons may be performed between observed KPI values and expected KPI values to generate one or more residuals that may serve as training inputs to the AI/ML model.

When a new data point arrives, such as from an attacked device, the data point may be evaluated, such as at the data processing stage 204, the GMM module applied, and an output 208 generated by the AI/ML engine that indicates the probability, based on evaluation of the new data point, of a DDOS attack, or other type of attack on the network, taking place by way of the attacked device. Finally, an investigation may be performed to identify the attacked device. Once the attacked device has been identified, a VNF pod may instruct other systems and devices in the network to ignore malicious calls coming from the attacked device. Attacks may originate from one device, or multiple devices. Either circumstance may be detected by embodiments of the invention. Moreover, even if an attack from a particular individual device is not detected, or detectable, for some reason, a multi-device attack in which that particular individual device is involved may nonetheless be detectable in embodiments of the invention.

C. Further Discussion, and Aspects of Some Example Use Cases

As apparent from this disclosure then, example embodiments of the invention may implement various features and functionalities. For example, embodiments may provide for a security component, which may be a VNF pod or an element of a VNF pod, that resides on the network data plane exposed to all IoT device traffic. In this way, the security component may provide protection against DDoS attacks, or other attacks, arriving from compromised IoT devices connected to the network. An ML model, which may be an element of a VNF pod, may likewise sit on a data plane such that the ML model is exposed to all traffic data. In this way, an application server on the network may be protected against DDoS attacks as those attacks are identified and blocked in the network infrastructure. During a training period, the ML model learns the normal behavior of all devices connected to the network and, at its deployment, the ML model may identify any exceptions to normal traffic caused by DDoS attacks and/or other attacks.

As another example, embodiments of the invention may implement approaches for protecting CBRS networks. As noted earlier herein, traditional WWW protection systems typically rely on static policy-based mechanisms. For new architectures such as CBRS however, with unknown attack surfaces, the rate of undiscovered attacks is higher than the rate of the solution developments. Early stage technology like CBRS may be well served by embodiments of the invention which comprise, among other things, ML/AI dynamic models for protection that can adjust to newly discovered threats.

Finally, example embodiments may provide protection against attacks from within the system. For example, in closed networks like CBRS, devices typically have been approved for access to the network based on a SIM authentication mechanism. In contrast, embodiments of the invention provide for an approach in which devices are monitored based on their network behavior within the system. The protection component that may be provided by example embodiments is invisible to the attacker abusing the device, since that protection component is located outside the device in the network infrastructure and may monitor all traffic of the entire data plane.

Embodiments of the invention may be employed in a variety of use cases to identify, mitigate, and/or block, attacks coming from one or more devices that were authorized to join a network. Some examples of such use cases are discussed below. One such use case for some example embodiments concerns critical services performed by hospitals. These services may be provided by devices such as CT (computed tomography), MRI (magnetic resonance imaging), and life support systems, that are reliant upon network communication for their operations. DICOM (digital imaging and communications in medicine) is an example of a communications standard that may be employed by such devices. Some entities such as hospitals are already using CBRS and, adoption is expected to increase as time goes by. An attack to the communication network could be a direct threat to the lives of patients and can be exploited by hostile organizations. As an example, an Alabama hospitals chain was the subject of a ransomware attack in 2019, which led to a full shutdown of their health services (www.al.com/news/2019/10/report-alabama-hospitals-pay-hackers-in-ransomware-attack.html).

Another example of a use case for example embodiments concerns nuclear power plants. In particular, nuclear power plants typically base their operations on closed systems which, due to safety considerations, are not connected to the internet. Still, such facilities are prone to attacks coming from within the system that can lead to major damage such as lack of cooling/explosions, radiation release, meltdown of plant facilities, and evacuation of surrounding perimeter. One example is the 2005 Siemens SCADA attack referred to elsewhere herein.

A final example of a use case for some example embodiments water treatment and distribution plants that may include various devices dispersed over large geographical, such as entire countries/states/counties. Such plants are examples of a system that may use CBRS technology as the network infrastructure, which enables efficient connection of devices, such as control and monitoring devices, to a control system. This CBRS approach may replace current wired internet connections and is much more scalable. For example, individual sluices in a water treatment facility may typically be handled manually. In a water treatment facility, chemicals such as chlorine and fluoride are regularly added to the water system and the use of those chemicals must be monitored reliably and consistently to avoid biological attacks. As one example, an attack occurred in Israel on April 2020 when the attackers tried to pump a large amount of chlorine into water systems, forcing the shutdown of agriculture pumps. (www.algemeiner.com/2020/04/26/israel-thwarts-major-coordinated-cyber-attack-on-its-water-infrastructure-command-and-control-systems/). Embodiments of the invention may be effective in detecting such attacks and taking preventive actions, mitigating actions, and/or, remedial actions.

D. Example Methods

Figure 3:
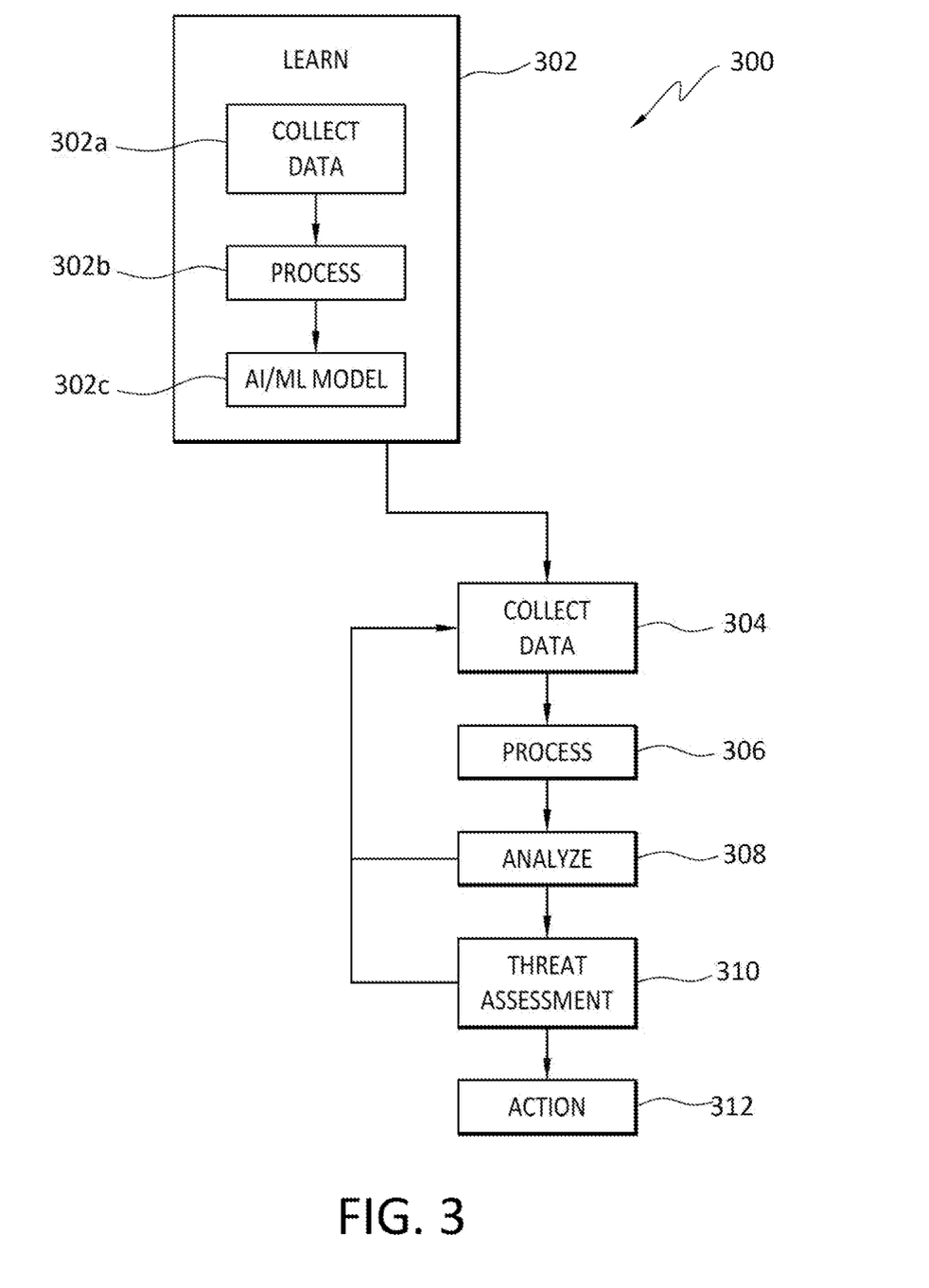
FIG. 3 discloses an example method for determining if an attack, or threat of attack, exists.

It is noted with respect to the example method of FIG. 3 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 3, the example method 300 may begin at 302 with a learning process which, in general, may serve to train an AI/ML model, and possibly thereby refine the AI/ML model as well, to recognize what is, and what is not, normal device behavior in a closed network such as a 5G CBRS network for example. The training procedure 302 may begin with the collection of data 302a. The data may be collected from devices in a functioning network and/or may comprise training data generated during a simulation process for example. The data may then be processed 302b, such as by a data processing function, examples of which are disclosed herein. The processed data may then be provided to an AI/ML model 302c for evaluation. The AI/ML model may, or may not, be modified based on the processing 302b and/or evaluation 302c of the data. The training process 302 may be performed a single time, or may be performed on an ongoing basis as the configuration of the network changes and new devices are added to, or removed from, the network. Further, the training process 302, as well as the other operations of the method 300, may be performed by an entity connected to the network, such as a VNF pod residing on an edge node of the network for example. The entity may, or may not, take part in normal network operations.

After the initial, and/or ongoing, training process 302 is completed, the AI/ML model may begin collecting data 304, such as by way of a data plane, in connection with normal network operations. In at least some embodiments, the collected data may comprise all the data generated by any devices connected to the network. The data may be collected 304 on an ongoing basis, or during one or more discrete time intervals.

The collected data 304, which may comprise raw traffic data generated by one or more network devices, may then be processed 306. In some embodiments, the process 306 may comprise processing raw traffic data into continuous time series data extracted from the raw traffic data. The processed 306 data may then be analyzed 308 to determine, for example, if any actual and/or potential threats to the network are present, and the source(s) of any such threats.

Any identified threats may then be assessed 310, and one or more corresponding actions 312 taken based on the assessment 310. For example, if the assessment 310 identifies a particular network device as having been attacked by a worm or other malicious code, the action 312 may comprise sending a message to the other network devices to avoid calls coming from that particular network device.

Finally, as indicated in FIG. 3, the processes 304 through 308/310 may be performed on an ongoing basis, and action 312 taken when needed. For example, if the analysis 308 does not reveal any threats, the method 300 may return to 304. On the other hand, if the analysis 308 reveals a threat that requires assessment 310, the method 300 may return to 304 at that point, and may also implement an appropriate action at 312.

E. Further Example Embodiments

Following are some further example embodiments of the invention. These are presented only by way of example and are not intended to limit the scope of the invention in any way.

Embodiment 1. A method, comprising: collecting, in a closed network, raw network traffic from one or more devices in the closed network; extracting metadata from the raw network traffic; processing the metadata; analyzing the metadata after the metadata has been processed; and based on the analyzing, determining whether or not an actual attack or attack threat is present in the closed network.

Embodiment 2. The method as recited in embodiment 1, wherein the method is performed by a VNF pod on an edge node of the closed network.

Embodiment 3. The method as recited in any of embodiments 1-2, wherein analysis of the metadata is performed using an AI/ML model.

Embodiment 4. The method as recited in any of embodiments 1-3, wherein the closed network is a 5G CBRS network.

Embodiment 5. The method as recited in any of embodiments 1-4, wherein the extracted metadata comprises TCP headers.

Embodiment 6. The method as recited in any of embodiments 1-5, wherein the determining indicates that an attack or attack threat is present in the closed network, and the method further comprises transmitting instructions to devices in the closed network not to accept calls from the device or devices which initiated the attack or present the attack threat.

Embodiment 7. The method as recited in any of embodiments 1-6, wherein the devices in the closed network were authorized to join the closed network, and one of the devices comprises an IoT device.

Embodiment 8. The method as recited in any of embodiments 1-7, wherein the actual attack or attack threat comprises, respectively, a DOS attack or DOS attack threat.

Embodiment 9. The method as recited in any of embodiments 1-8, further comprising identifying the device or devices in the closed network which initiated the attack or present the attack threat.

Embodiment 10. The method as recited in any of embodiments 1-9, wherein the raw network traffic is collected by way of a data plane through which all the raw network traffic passes.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
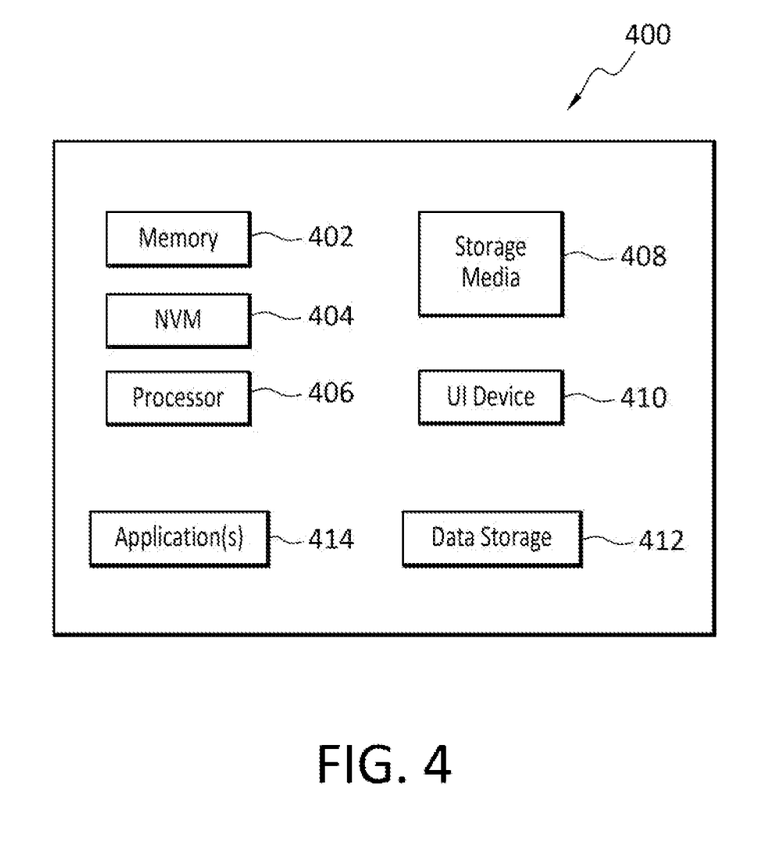
FIG. 4 discloses an example computing entity configured and operable to perform any of the disclosed methods and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   collecting, in a closed network, raw network traffic from one or more devices in the closed network;
   extracting metadata from the raw network traffic;
   creating aggregated data by aggregating the raw network traffic with the metadata;
   processing the aggregated data into time series data;
   inputting the time series data to an AI/ML model;
   analyzing the time series data using the AI/ML model after the aggregated data has been processed; and
   based on the analyzing, determining whether or not an actual attack or attack threat is present in the closed network.

2. The method as recited in claim 1, wherein the method is performed by a VNF pod on an edge node of the closed network.

3. The method as recited in claim 1, wherein the closed network is a 5G CBRS network.

4. The method as recited in claim 1, wherein the extracted metadata comprises TCP headers.

5. The method as recited in claim 1, wherein the determining indicates that an attack or attack threat is present in the closed network, and the method further comprises transmitting instructions to the one or more devices in the closed network not to accept calls from the one or more devices within the closed network which initiated the attack or present the attack threat.

6. The method as recited in claim 1, wherein the one or more devices in the closed network were authorized to join the closed network, and one of the devices comprises an IoT device.

7. The method as recited in claim 1, wherein the actual attack or attack threat comprises, respectively, a DOS attack or DOS attack threat.

8. The method as recited in claim 1, further comprising identifying the one or more devices in the closed network which initiated the attack or present the attack threat.

9. The method as recited in claim 1, wherein the raw network traffic is collected by way of a data plane through which all the raw network traffic passes.

10. A non-transitory storage medium having stored therein instructions that are executable by one or more hardware processors to perform operations comprising:
    collecting, in a closed network, raw network traffic from one or more devices in the closed network;
    extracting metadata from the raw network traffic;
    creating aggregated data by aggregating the raw network traffic with the metadata;
    processing the aggregated data into time series data;
    inputting the time series data to an AI/ML model;
    analyzing the time series data using the AI/ML model after the aggregated data has been processed; and
    based on the analyzing, determining whether or not an actual attack or attack threat is present in the closed network.

11. The non-transitory storage medium as recited in claim 10, wherein the operations are performed by a VNF pod on an edge node of the closed network.

12. The non-transitory storage medium as recited in claim 10, wherein the closed network is a 5G CBRS network.

13. The non-transitory storage medium as recited in claim 10, wherein the extracted metadata comprises TCP headers.

14. The non-transitory storage medium as recited in claim 10, wherein the determining indicates that an attack or attack threat is present in the closed network, and the method further comprises transmitting instructions to the one or more devices in the closed network not to accept calls from the one or more devices within the closed network which initiated the attack or present the attack threat.

15. The non-transitory storage medium as recited in claim 10, wherein the one or more devices in the closed network were authorized to join the closed network, and one of the devices comprises an IoT device.

16. The non-transitory storage medium as recited in claim 10, wherein the actual attack or attack threat comprises, respectively, a DOS attack or DOS attack threat.

17. The non-transitory storage medium as recited in claim 10, wherein the operations further comprise identifying the one or more devices in the closed network which initiated the attack or present the attack threat.

18. The non-transitory storage medium as recited in claim 10, wherein the raw network traffic is collected by way of a data plane through which all the raw network traffic passes.

* * * * *